United States Patent
Therene et al.

(10) Patent No.: US 7,188,225 B1
(45) Date of Patent: Mar. 6, 2007

(54) STORAGE SYSTEM WITH DISK DRIVE POWER-ON-RESET DETECTION

(75) Inventors: Christophe Therene, Livermore, CA (US); Paul R. Stonelake, Santa Clara, CA (US); Alex Ga Hing Tang, Fremont, CA (US); Richard L. Harris, San Jose, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 447 days.

(21) Appl. No.: 10/900,998

(22) Filed: Jul. 28, 2004

Related U.S. Application Data (60) Provisional application No. 60/527,243, filed on Dec. 5, 2003, provisional application No. 60/545,957, filed on Feb. 19, 2004.

(51) Int. Cl.
*G06F 12/00* (2006.01)
(52) U.S. Cl. .................. 711/164; 711/152; 711/163; 711/112; 711/113; 711/114
(58) Field of Classification Search .................. None
See application file for complete search history.

(56) References Cited

U.S. PATENT DOCUMENTS 5,375,243 A * 12/1994 Parzych et al. ............... 726/17

6,775,794 B1 * 8/2004 Horst et al. ................... 714/42

OTHER PUBLICATIONS

Intel Technical Advisory TA-617-1, dated Jan. 1, 2003, titled "*Intel RAID Controllers: RAID Levels 1, 4, 5 or 10 Dirve Removal and Immediate Re-insertion May Cause An Array Failure.*"
8-page document titled "*AMIBIOS8 Hard Disk Security*," version 1.1, dated Nov. 26, 2002, downloaded from www.ami.com.

* cited by examiner

*Primary Examiner*—Reginald Bragdon
*Assistant Examiner*—Thanh D Vo
(74) *Attorney, Agent, or Firm*—Knobbe, Martens, Olson & Bear LLP (57) ABSTRACT

A disk array controller reliably detects disk drive power-on-reset events that may cause a disk drive that has uncommitted write data stored in its cache to lose such data. The methods for detecting the power-on-reset events include operating the disk drives in an ATA security mode in which a power-on-reset of a disk drive will cause the drive to enter a locked state in which data transfer commands are aborted; and tracking power cycle count attributes of the disk drives over time. When a disk drive power-on-reset event is detected, the disk array may be efficiently restored to an operational state by re-executing or "replaying" a set of write commands that are cached within the disk array controller. The invention is also applicable to single-disk-drive storage systems.

20 Claims, 11 Drawing Sheets

STORAGE SYSTEM WITH DISK DRIVE POWER-ON-RESET DETECTION

PRIORITY CLAIM

This application claims the benefit of U.S. Provisional Patent Appl. No. 60/527,243, filed Dec. 5, 2003, and U.S. Provisional Patent Appl. No. 60/545,957, filed Feb. 19, 2004.

BACKGROUND OF THE INVENTION

1. Field of the Invention

The present invention relates to storage systems, such as but not limited to redundant disk arrays, that use hard disk drives to store data. More particularly, the invention involves methods for reliably detecting power-on-reset events that can result losses of data, and for recovering from such events.

2. Description of the Related Art

A disk drive can experience an unwanted or unexpected power-on-reset ("POR") event due to various types of anomalies, such as a loose power cable connection, a failing power supply, or a power voltage drop caused by another component. When such a POR event occurs, write data that has been cached by the disk drive but has not yet been written to the magnetic disk media may be lost, especially if the POR event is not detected. One solution to this problem is to disable the write caching feature of the disk drive. For example, some manufactures of disk array systems ship these systems with disk drives that have write caching disabled. This approach, however, can significantly impact the performance of the storage system.

SUMMARY

One embodiment of the invention is a disk array controller that reliably detects disk drive power-on-reset events that may cause a disk drive that has uncommitted write data stored in its cache to lose such data. The disclosed methods for detecting the power-on-reset events include operating the disk drives in an ATA security mode in which a power-on-reset of a disk drive will cause the drive to enter a locked state in which data transfer commands are aborted; and tracking power cycle count attributes of the disk drives over time. When a disk drive power-on-reset event is detected, the array may be maintained in an operational state by re-executing or "replaying" a set of write commands that are cached within the disk array controller. The invention is also applicable to single-disk-drive storage systems.

The invention includes a disk array system comprising a plurality of disk drives, and an array controller that controls the plurality of disk drives as a redundant array with a write caching feature of each disk drive enabled. The array controller monitors each of the plurality of disk drives to detect power-on-reset events at least in part by (a) setting passwords on each of the disk drives to place each such disk drive in an unlocked state, such that disk drives that experience power-on-reset events will enter into a locked state in which they will abort data transfer commands, and (b) when a disk drive that has been placed into the unlocked state aborts a data transfer command, performing a power-on-reset test to evaluate whether the disk drive has experienced a power-on-reset event since being placed into the unlocked state.

The invention additionally includes a method of controlling a disk drive so as to detect power-on-reset events. The method comprises issuing a set password command to the disk drive to cause the disk drive to enter an unlocked state, wherein the disk drive is responsive to a power-on-reset event while in the unlocked state by entering into a locked state in which data transfer commands are aborted; issuing a data transfer command to the disk drive subsequently to issuing the set password command; and if the disk drive aborts the data transfer command, performing a power-on-reset test to evaluate whether the disk drive aborted the data transfer command as a result of a power-on-reset event that caused the disk drive to enter into the locked state.

The invention further includes a method of detecting disk drive power-on-reset events. The method comprises reading from a disk drive an initial power cycle count attribute of the disk drive, and storing the initial power cycle count attribute in memory; detecting an error event which indicates that the disk drive may have undergone a power-on-reset event; and in response to detecting the error event, reading a current power cycle count attribute of the disk drive, and comparing the current power cycle count attribute to the initial power cycle count attribute to evaluate whether the error event was caused by a power-on-reset event.

Neither this summary nor the following detailed description purports to define the invention. The invention is defined only by the claims.

DETAILED DESCRIPTION OF THE PREFERRED EMBODIMENTS

I. Overview

The present invention comprises circuits and processing methods for reliably detecting disk drive power-on-reset (POR) events that may cause a disk drive to lose write data that it has cached but not yet committed to disk. The invention also comprises methods for recovering from potential data losses caused by disk drive POR events. The invention is applicable both to disk array systems in which data is spread across multiple disk drives (typically in a RAID or other redundant configuration), and to single-drive configurations commonly used within personal computers.

One feature of the invention involves the use of the security feature set of ATA (Advanced Technology Attachment) disk drives to detect POR events, and especially POR events that occur while no disk drive commands are pending. Another feature involves the use of the SMART (Self Monitoring Analysis and Reporting Technology) power cycle count attribute of certain disk drives to determine whether a POR has occurred since a particular point in time. Another feature, which may be used with ATA disk drives that do not maintain a SMART power cycle count attribute, involves evaluating whether a POR has occurred by determining whether the disk drive has unexpectedly transitioned out of the Ultra DMA mode. Yet another feature, referred to as "write command journaling," involves caching write commands and data within an array controller or other storage controller, and replaying these write commands when a disk drive POR event is detected to correct for a potential data loss.

These features may be used individually or in combination within a given storage system to reliably detect and correct for POR events. In the preferred embodiment described below, all four techniques are implemented in combination within a disk array controller that supports both Serial ATA and Parallel ATA disk drives. The invention, however, is not limited to disk array controllers, and does not require that the disclosed features be used in combination. The scope of the invention is defined only by the claims.

Figure 1:
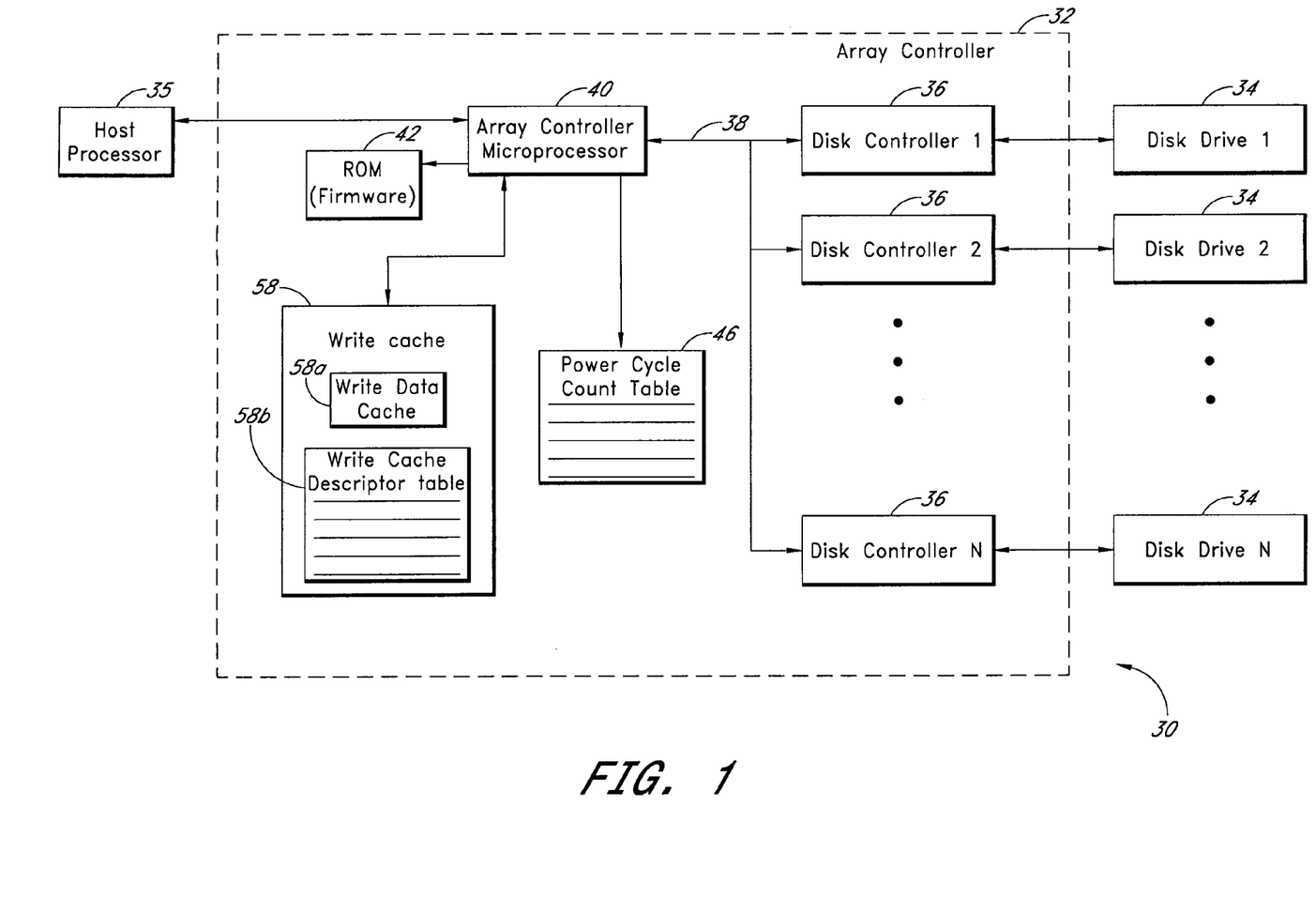
FIG. 1 illustrates a disk array storage system according to one embodiment of the invention.

FIG. 1 illustrates a disk array controller system 30 according to one embodiment of the invention. The system comprises an array controller 32 that is connected to and controls a set of N disk drives 34 (where N is typically in the range of 2–15, and is commonly 4, 8 or 12). The array controller 32 is coupled to and receives commands from a host processor 35. The host processor 35 may, for example, be the main processor or processor cluster of an iSCSI-based or other block-level storage server, a file server, or an application server, a personal computer, or another type of host system that hosts the array controller. The array controller 32 may, for example, be the same or similar in architecture to the disk array controller disclosed in U.S. Pat. No. 6,138,176.

The array controller 32 preferably supports one or more different RAID levels (such as levels 0, 1, 4, 5 and 10) to operate the disk drives 34 as a redundant array. (A "redundant array" is generally a group of two or more disk drives configured such that if a disk drive is lost, the data stored by that disk drive can be reconstructed or otherwise obtained from the surviving disk drive or drives.) Each disk drive 34 is controlled by a respective disk controller 36, although multiple disk drives 34 may alternatively be controlled by a single disk controller 36 in some embodiments.

The disk controllers 36 communicate over a bus 38 with an array controller processor 40, which sends commands to the disk controllers to initiate disk operations. A separate bus (not shown) may be provided within the array controller 32 for carrying input/output (I/O) data to and from the disk controllers 36, as described in the '176 patent. The array controller processor 40 is preferably a microcontroller or microprocessor that executes a firmware program. The firmware program is stored in a ROM (read-only memory) device 42, and includes code modules for implementing the various POR detection and recovery features depicted in FIGS. 4–11 and described below. The features may alternatively be implemented in-whole or in-part within application-specific hardware, or within program code executed by a host processor.

As illustrated in FIG. 1, the array controller 32, under the control of the firmware program, preferably maintains a Power Cycle Count Table 46 in random access memory of the array controller. As described below, this table 46 stores a power cycle count value for each disk drive 34 of the array (or at least those disk drives that maintain a readable SMART power cycle count attribute), and is used as part of a POR test sequence.

Figure 2:
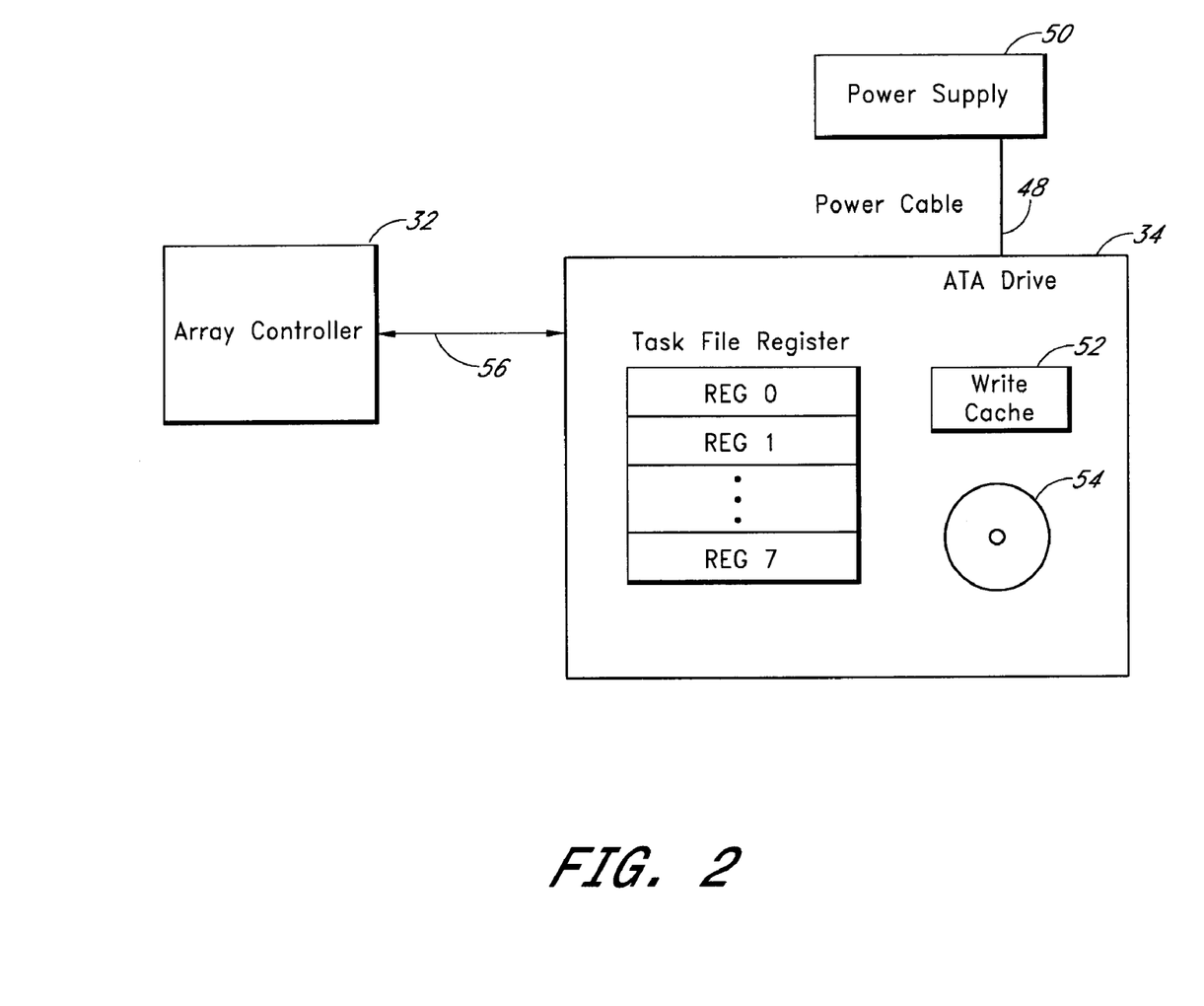
FIG. 2 illustrates an ATA disk drive connected to the array controller and a power supply in the system of FIG. 1.

As illustrated in FIG. 2, each disk drive 34 of the array (one shown) is preferably an ATA disk drive, such as a SATA (Serial ATA) or PATA (Parallel ATA) disk drive. Each disk drive 34 is connected by a respective power cable 48 to a shared power supply 50, and is connected to the array controller 32 by a disk drive cable 56 or other connector. As mentioned above, a loose power cable connection between the power supply 50 and a given disk drive 34 can cause the disk drive to perform an unwanted POR. Unwanted POR events can also result from power supply failures, and from other sources of power supply voltage drops. Assuming that write caching is enabled (as is preferred to maintain a high level of I/O performance), write data stored in the disk drive's cache 52 at the time of the unwanted POR event will ordinarily be lost if it has not yet been committed to the spinning, non-volatile media 54. Typically, a host system will not immediately become aware of this data loss, as disk drives commonly report write command completion before the write data has actually been written to the non-volatile media 54. If, on the other hand, the POR event can be promptly detected (especially before the disk drive 34 performs subsequent data transfer operations), an appropriate corrective action can be taken before a permanent data loss occurs. Thus, a goal of the present invention is to reliably detect disk drive POR events, preferably before the relevant disk drive 34 had completed a subsequent data transfer command.

Referring again to FIG. 1, the disk array controller 32 may include its own write cache 58 for caching write commands and associated data received from the host computer or processor 35. If such a controller-level write cache 58 is included, the array controller 32 may optionally implement a "write command journaling" feature to correct for potential data losses caused by disk drive POR events. An important benefit of the write command journaling feature is that it allows the disk array to maintain its operational state without the need to either replace the affected disk drive or to perform a relatively time consuming array rebuild operation.

Briefly, the write command journaling feature involves maintaining, within the controller-level cache 58, a record of the write commands that have been executed by the array controller 32 since the disk drives 34 last committed their cached write data to disk media. (The term "executed," in this context, refers generally to the process of writing the associated write data to the disk drive or drives 34 invoked by such write commands.) If a disk drive experiences a POR event during this period of time—potentially resulting in a loss by the disk drive of write data it has cached but not yet committed to disk media—the write commands represented within controller-level write cache 58 are re-executed or "replayed." Data that was previously written to the disk array is thus re-written to the disk array to correct for the potential data loss.

Figure 10:
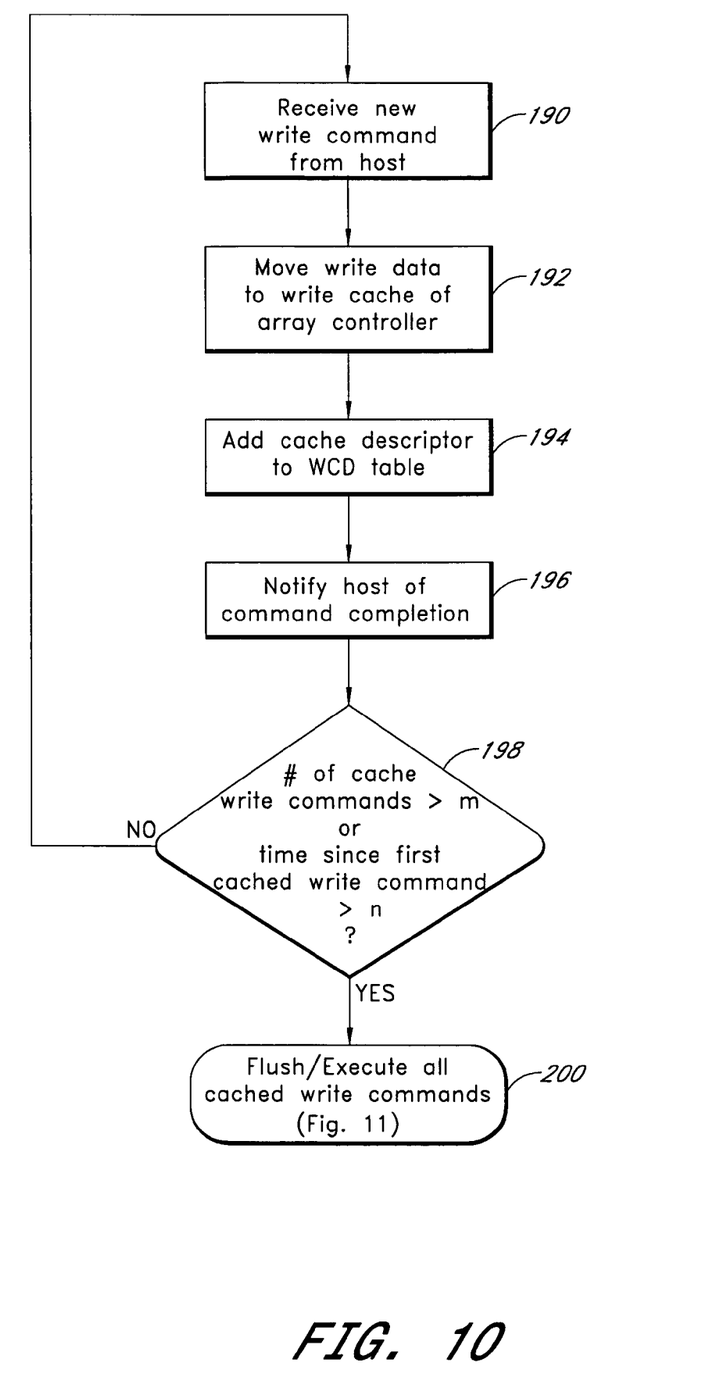
FIG. 10 illustrates a write command journaling process that may be implemented by the array controller to support an ability to efficiently restore a disk array after an unexpected power-on-reset is detected.
Figure 11:
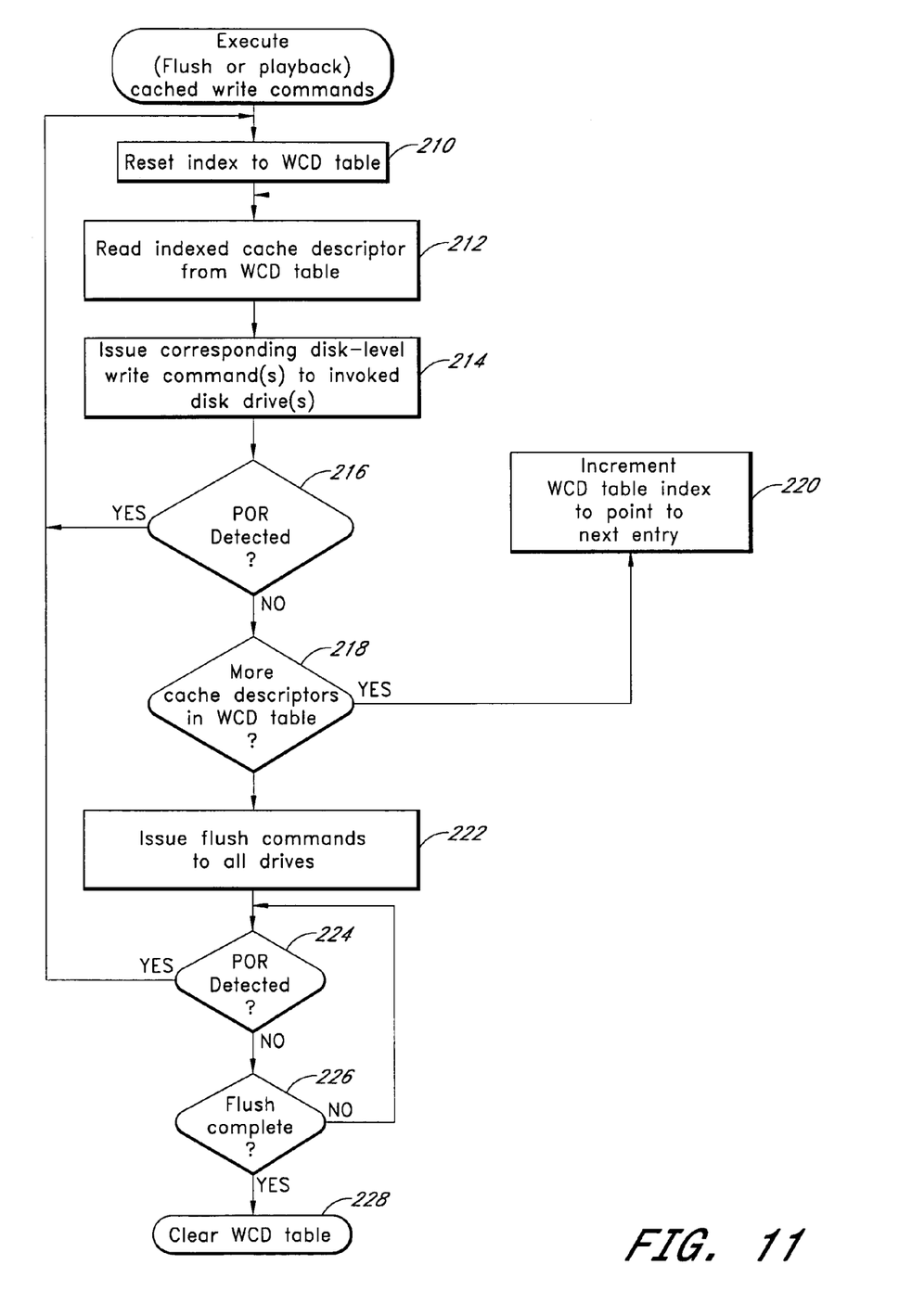
FIG. 11 illustrates an associated process for flushing and playing back cached write commands.

As depicted in FIG. 1, the task of keeping track of the write data that has been written to the array but not yet committed to disk media is preferably performed by the array controller processor 40 by maintaining a Write Cache Descriptor Table 58b in RAM. The array controller 32 caches and replays the write commands at the array level in the preferred embodiment, such that cached write data is rewritten to the array as a whole rather than merely being rewritten to the drive that underwent the POR. In other embodiments, write commands may be replayed at the disk drive level such that write commands and data are re-sent only to the disk drive that experienced the POR. A preferred embodiment of the write command journaling feature is depicted in FIGS. 10 and 11 and is described below.

II. Detection of Power-On-Reset Events

Figure 3:
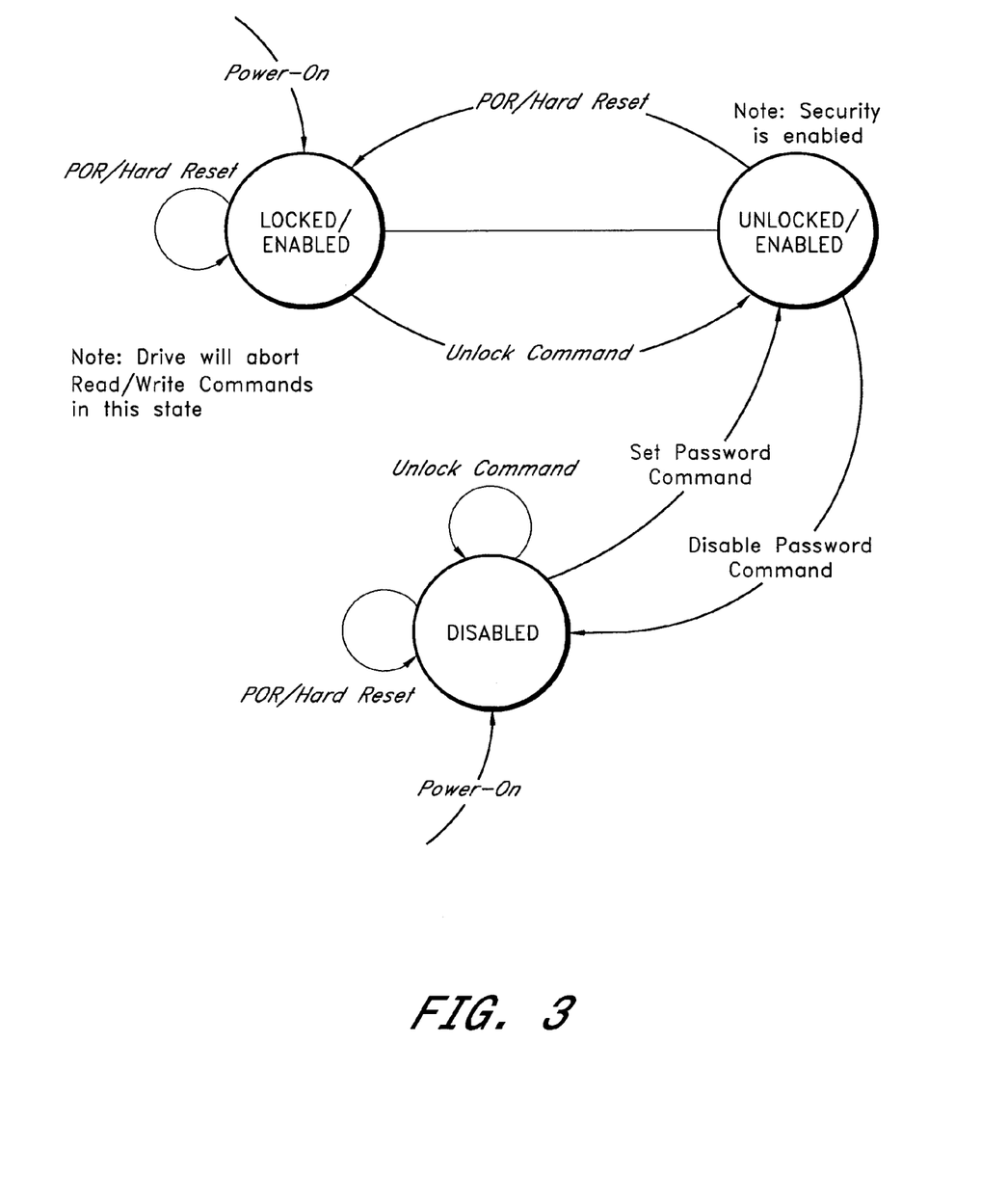
FIG. 3 is a state diagram that illustrates a security set feature commonly implemented within ATA disk drives.

FIG. 3 is a state diagram that illustrates a security set feature commonly implemented within ATA disk drives. As illustrated, unless security has been enabled, the disk drive will enter unto a "disabled" state upon power up or following a reset event. To enable the security feature, a "set password" command can be issued to assign a password to the disk drive 34, causing the disk drive to enter into the "unlocked/enabled" state. (Note that the terms "enabled" and "disabled" in FIG. 3 refer to the disk drive's security status, and not to the drive's general ability to perform data transfer operations.) If a POR or hard reset occurs while the disk drive 34 is in the unlocked/enabled state, the disk drive will transition into a "locked/enabled" state. While in this locked state, the disk drive will abort read and write commands to ensure that unauthorized entities do not perform data transfer operations. As described below, this characteristic of ATA disk drives is used within the preferred embodiment as one mechanism for detecting whether a POR event has occurred. To return the disk drive 34 to the unlocked state, an unlock command may be issued to the disk drive with a password that matches the password previously set by the "set password" command. Additional information about the security feature is included in various ATA specifications.

Figure 4:
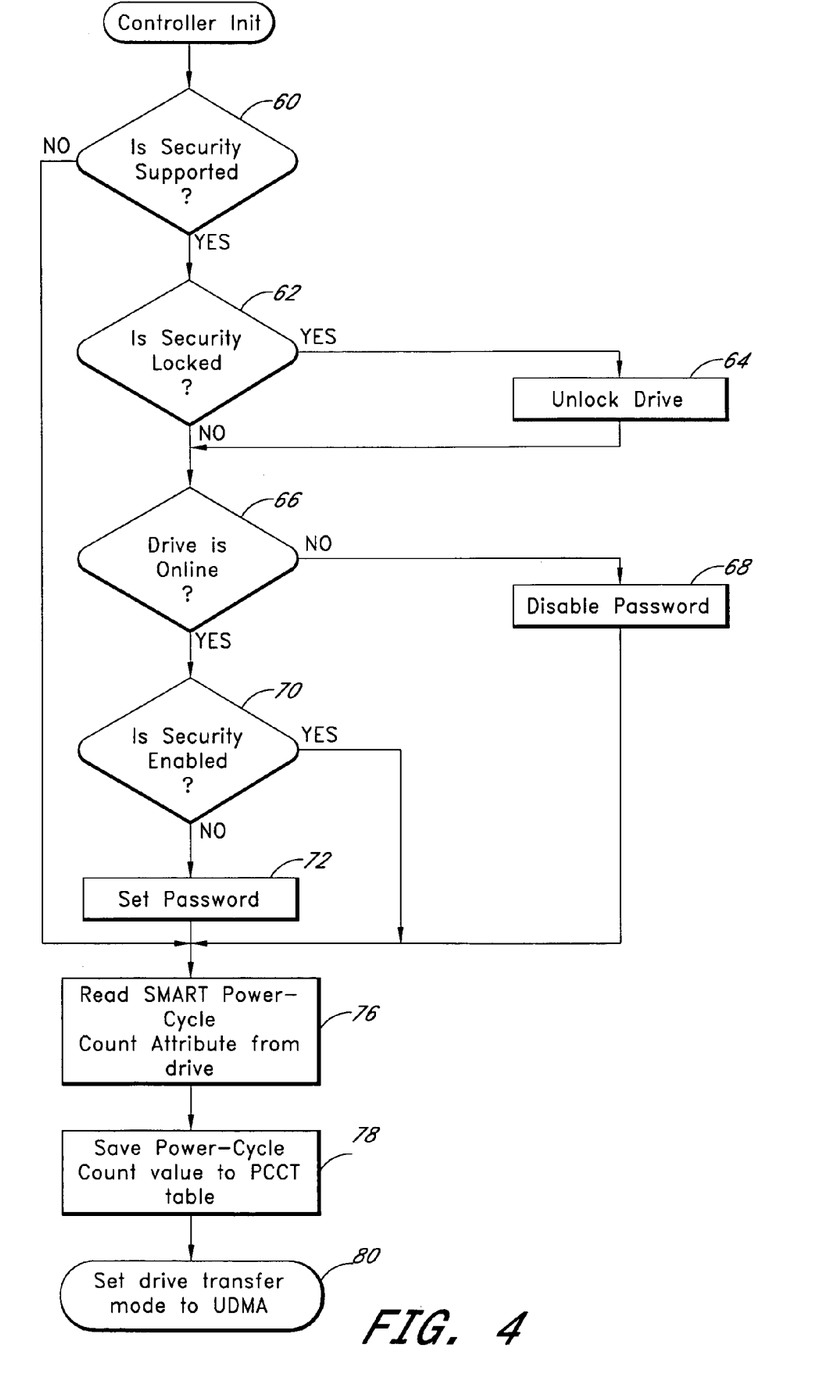
FIG. 4 illustrates an initialization sequence that is executed by the array controller separately for each disk drive in the system of FIG. 1.

FIG. 4 illustrates an initialization sequence that is executed by the array controller 32 separately for each disk drive 34. This initialization sequence is preferably embodied within firmware executed by the array controller processor 40 when the disk array controller is powered up or otherwise initialized. Some or all of the functionality of this initialization sequence may alternatively be offloaded to (e.g., implemented within state machine logic of) the individual disk controllers 36. As illustrated, the array controller 32 initially determines whether the particular disk drive 34 supports the ATA security feature by checking word #82, bit 1 of the drive's response to an Identify Device command (step 60), and skips to step 76 if it does not. Assuming the disk drive supports security (as is the case for most PATA and SATA disk drives), the program executes a disk drive configuration sequence in which (a) a "security unlock" ATA command (0xF2) is issued to unlock the disk drive if the disk drive is in the locked/enabled state (steps 62 and 64); (b) the "security disable password" ATA command (0xF6) is issued if the drive is not online (steps 66 and 68); and (c) a "security set password" ATA command (0xF1) is issued if the drive is online with security disabled (steps 70 and 72). Assuming the disk drive 34 is online (i.e., is part of a disk array or single-disk configuration that is online), it will be in the unlocked/enabled state following this configuration sequence.

In steps 76 and 78, the array controller 32 reads the disk drive's SMART power cycle count attribute, and stores this count value in the Power Cycle Count (PCCT) table 46 shown in FIG. 1. This attribute represents the total number of times the disk drive has been powered up since being manufactured, and is commonly used to predict disk drive failures before they occur. If the disk drive does not implement the SMART feature set (as is the case for some PATA disk drives), steps 76 and 78 may be skipped. Finally, in step 80, the array controller 32 places the disk drive 34 into its Ultra DMA (UDMA) mode.

Figure 5A:
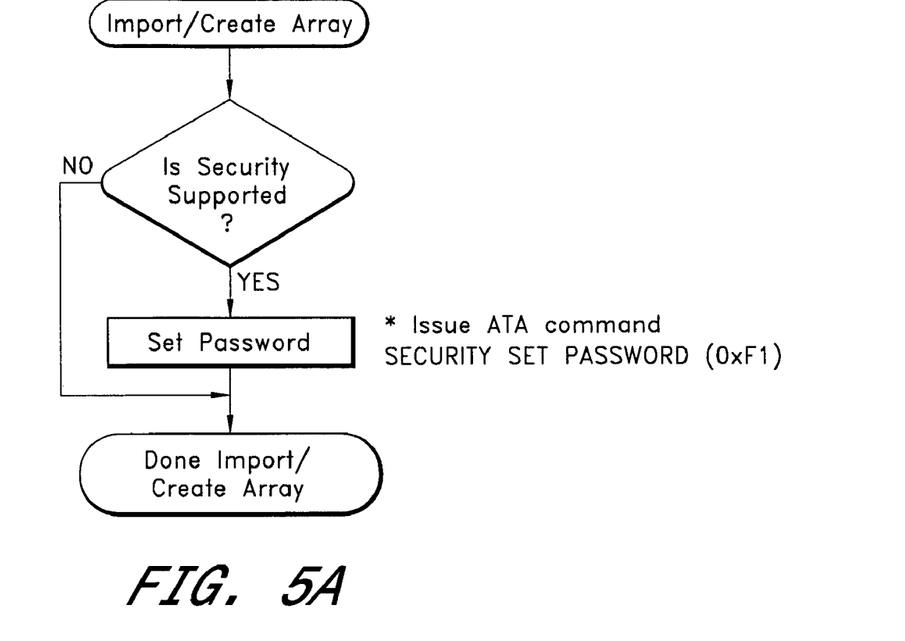
FIGS. 5A and 5B illustrate the process of setting and disabling disk drive passwords as the result of array creation and deletion events in the system of FIG. 1.
Figure 5B:
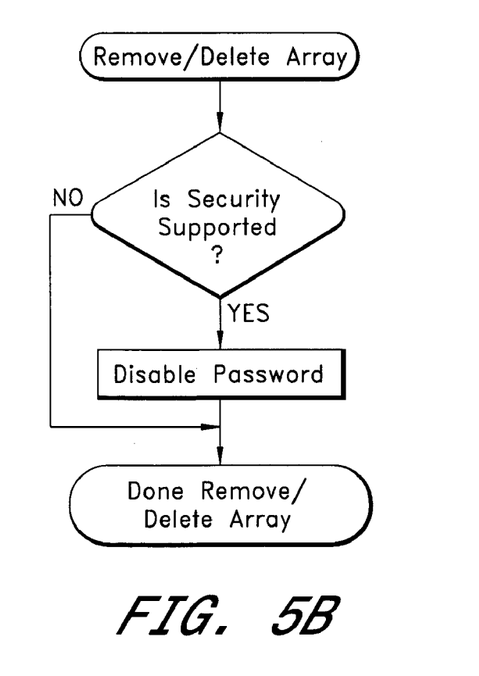

In addition to setting and disabling disk drive passwords as part of the controller initialization process of FIG. 4, a disk drive's password may be set when the disk drive becomes a member of a disk array, and may be disabled when the disk array is removed or deleted. The process of setting and disabling disk drive passwords as the result of array creation and deletion events is depicted in FIGS. 5A and 5B, respectively. Disabling the password on disk drives that are not being used allows these drives to be moved, if desired, to another storage system.

Figure 6:
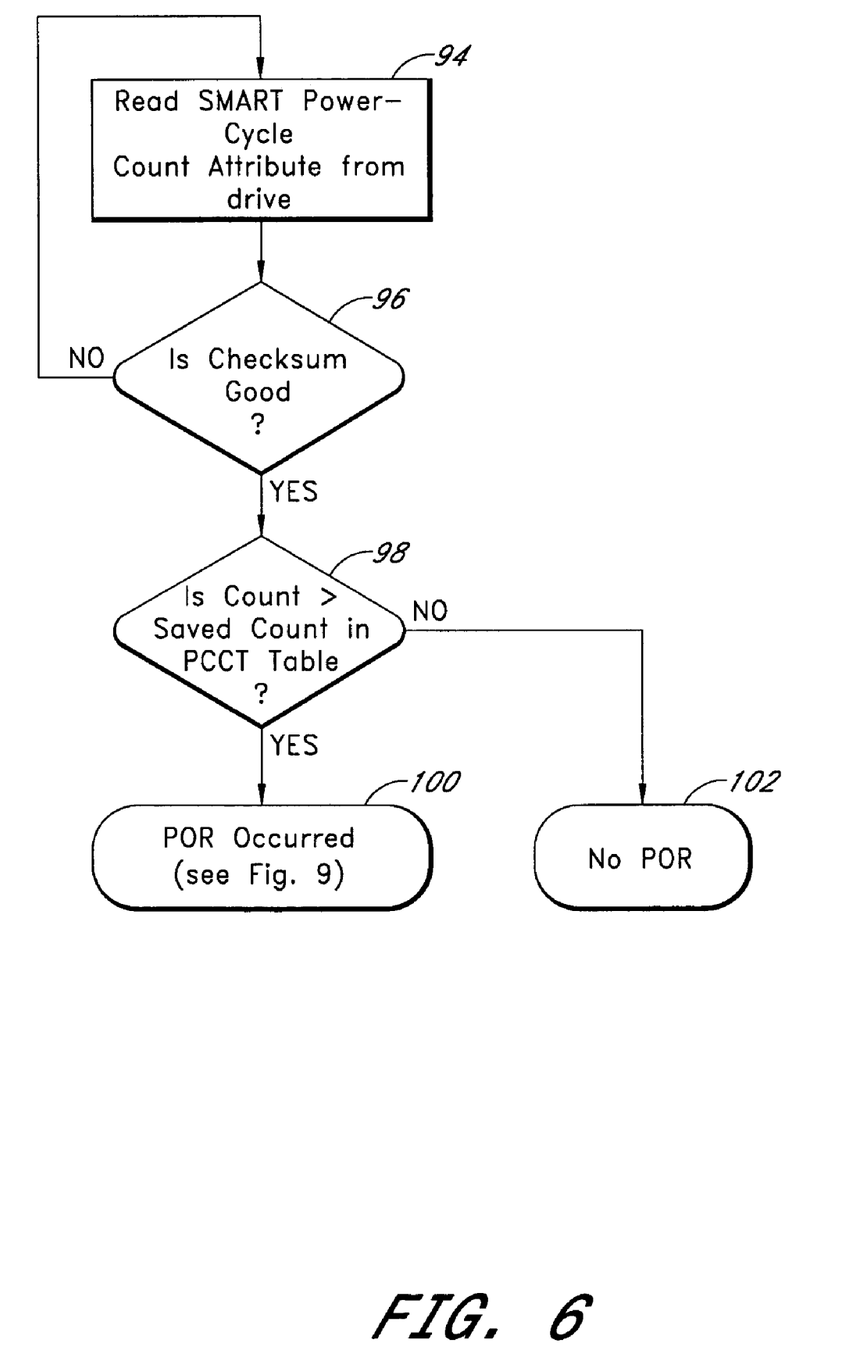
FIG. 6 illustrates a power-on-reset test that may be performed by the array controller to evaluate whether a particular Serial ATA or Parallel ATA disk drive has experienced a power-on-reset event.

FIG. 6 illustrates a POR test that may be performed by the array controller 34 to evaluate whether a particular SATA or PATA disk drive 34 has experienced a POR event since its power cycle count attribute was last copied to the PCCT table 46. For PATA drives that do not maintain a SMART power cycle count attribute, the alternative POR test shown in FIG. 7 may be used. As shown in FIG. 8 and discussed below, the POR test of FIG. 6 or 7 is preferably performed in response to detection of certain types of disk drive errors or anomalies that suggest that an unexpected POR event may have occurred.

As illustrated in FIG. 6, the SMART-based POR test involves reading the disk drive's current SMART power cycle count attribute and verifying the associated checksum (steps 94 and 96), and then comparing this current power cycle count value to the associated count value stored in the PCCT table 46 for this particular disk drive (step 98). If the current count value exceeds the value stored in the table 46, a POR is deemed to have occurred since controller initialization (block 100); otherwise, it is assumed that no such POR has occurred (block 102). If a POR is detected, the code sequence depicted in FIG. 9 (discussed below) may be executed to invoke an appropriate remedial action. An ATA disk drive's power cycle count attribute can be read by issuing the SMART command READ_ATTRIBUTE_VALUES (0xD0) to the drive and checking attribute ID=(0x0C).

Figure 7:
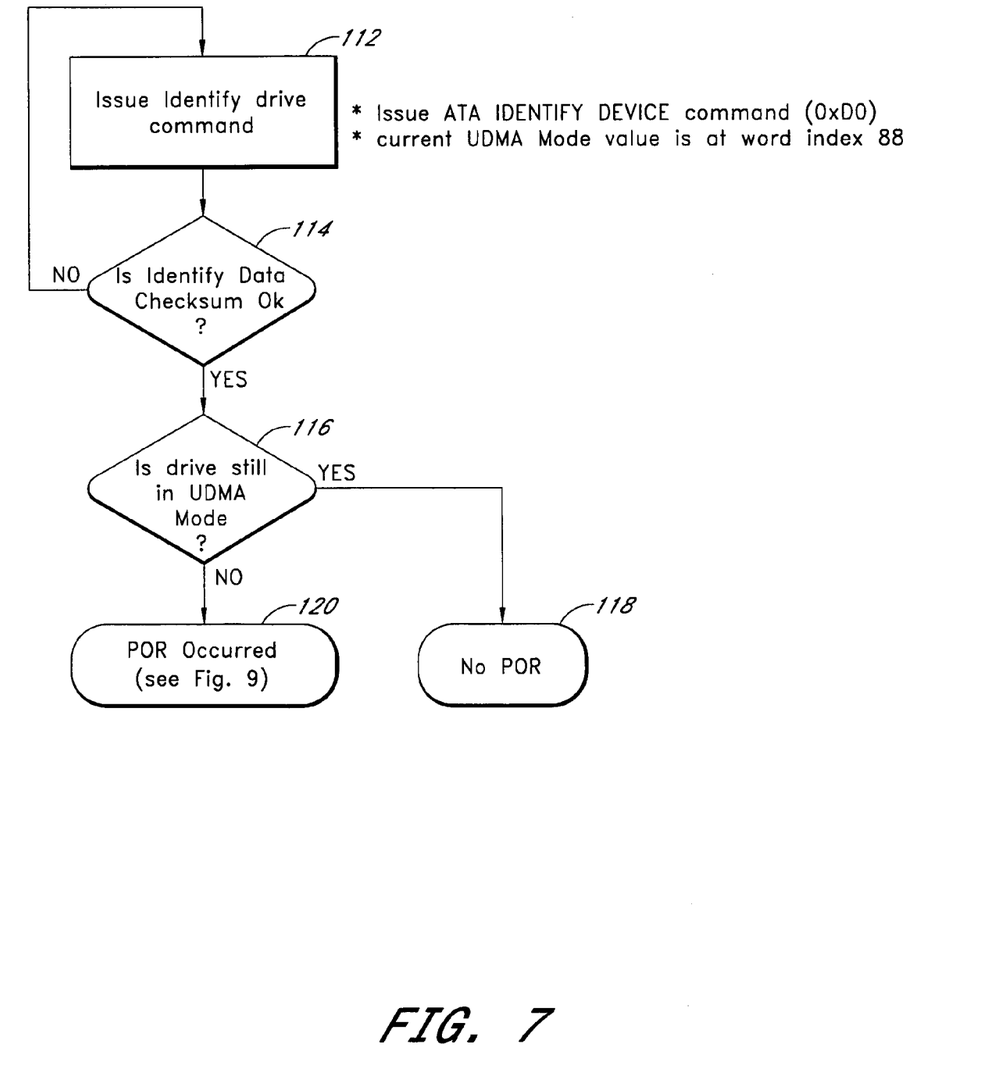
FIG. 7 illustrates an alternative power-on-reset test that may be used with parallel ATA disk drives that do not maintain a SMART power cycle count attribute.
Figure 8:
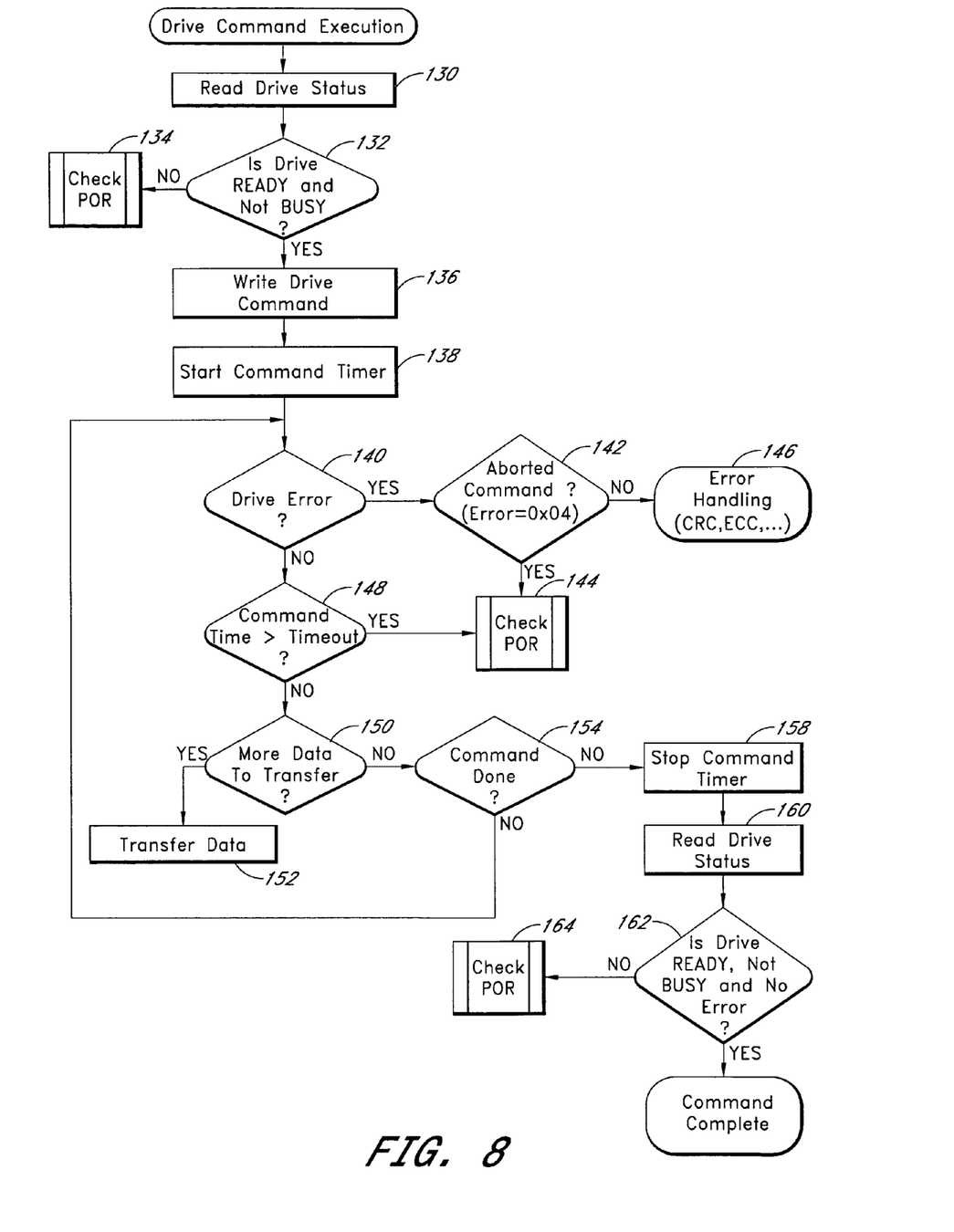
FIG. 8 illustrates a disk drive command execution sequence implemented by the array controller of FIG. 1.

The alternative POR test shown in FIG. 7 relies on the fact that a PATA disk drive will ordinarily transition out of the UDMA mode when a POR event occurs. (Because SATA disk drives do not behave this way, the POR test of FIG. 7 in not generally suitable for SATA disk drives.) As illustrated by steps 112–116, the array controller 32 issues an "identify device" command to the PATA disk drive 34, verifies the checksum included within the disk drive's response, and then checks the response to determine whether the disk drive is still in the UDMA mode (as previously set during the initialization sequence of FIG. 4). If the disk drive is still in the UDMA mode, it is assumed that no POR event has occurred since the most recent execution of the controller initialization sequence of FIG. 4 (step 118). If the disk drive is no longer in the UDMA mode, a POR is deemed to have occurred (block 120). If a POR is detected, the code sequence depicted in FIG. 9 (discussed below) may be executed to invoke an appropriate remedial action.

FIG. 8 illustrates a disk drive command execution sequence that is implemented by the array controller 32 to send data transfer (read and write) commands to specific disk drives 34, and to monitor the execution of these commands. As illustrated by the three blocks labeled "check POR," if a disk drive error is detected that suggests that a POR event may have occurred, the POR test of FIG. 6 or FIG. 7 (depending on the drive type) is preferably performed to determine whether a POR event actually occurred. One such disk drive error is an aborted command error (block 142), which indicates that the ATA disk drive may have entered into the "locked/enabled" state (FIG. 3) as the result of a POR event.

As depicted by steps 130 and 132 of FIG. 8, the array controller 32 initially reads and checks the disk drive's status. If an unexpected status is detected (namely a "not ready" or "busy" status), the POR test of FIG. 6 or 7 is executed (step 134); otherwise, the data transfer command is written to the disk drive 34 and a command timer is started (steps 136 and 138).

If the disk drive 34 responds to the command by reporting an error (step 140), the array controller 32 checks the error type (step 142), and initiates a POR test (step 144) if the error is an aborted command error. By performing a POR test when the data transfer command is aborted, the array controller 32 is advantageously capable of determining whether the disk drive 34 experienced a POR event while no data transfer command was pending. If a different type of disk drive error is detected in block 142 (such as an ECC or CRC error), the array controller 32 may invoke an appropriate error handler to process the error (step 146). As depicted by the "yes" branch of block 148, the POR test may also be invoked if a command timeout error occurs.

As depicted by steps 150–154 and the associated loop back to step 140, the process of checking for and handling disk drive errors (steps 140–148) may be repeated until the associated data transfer is complete. Once the command has been completed, the command timer is stopped (step 158), and the disk drive's status is again checked (steps 160 and 162). If the disk drive 34 reports that it is ready, not busy, and has not detected an error, the command is treated as complete; otherwise, the POR test is performed to determine whether a POR event has occurred (step 164).

As a result of the processes shown in FIGS. 6–8, a POR that occurs during execution of an ATA disk drive command will cause an illegal status or a command timeout to be detected (see blocks 132, 148, and 162), resulting in detection of the POR event during a subsequent POR test. In addition, for disk drives that support ATA security (as is the case for most ATA disk drives), a POR that occurs while no disk drive commands are pending will cause the disk drive 32 to enter into the locked state, resulting in the next data transfer command being aborted (block 142) and the POR event being detected. Because POR events are reliably and promptly detected, the write caching feature of the disk drives 32 can be maintained in an enabled state with very little or no added risk of permanent data loss.

The processes depicted by FIGS. 6–8 are preferably implemented within firmware executed by the array controller's processor 40 (FIG. 1), but may alternatively be implemented in-whole or in-part within automated, application-specific circuitry of the array controller. As will be apparent, some of the steps shown in FIGS. 6–8 can be omitted or performed in a different order. For instance, in embodiments that only support SMART-enabled disk drives, the alternative POR test of FIG. 7 may be omitted; in addition, POR tests may be invoked during different phases of the command execution sequence than those depicted in FIG. 8.

III. Corrective Actions for Recovering from Power-On-Reset Events

Figure 9:
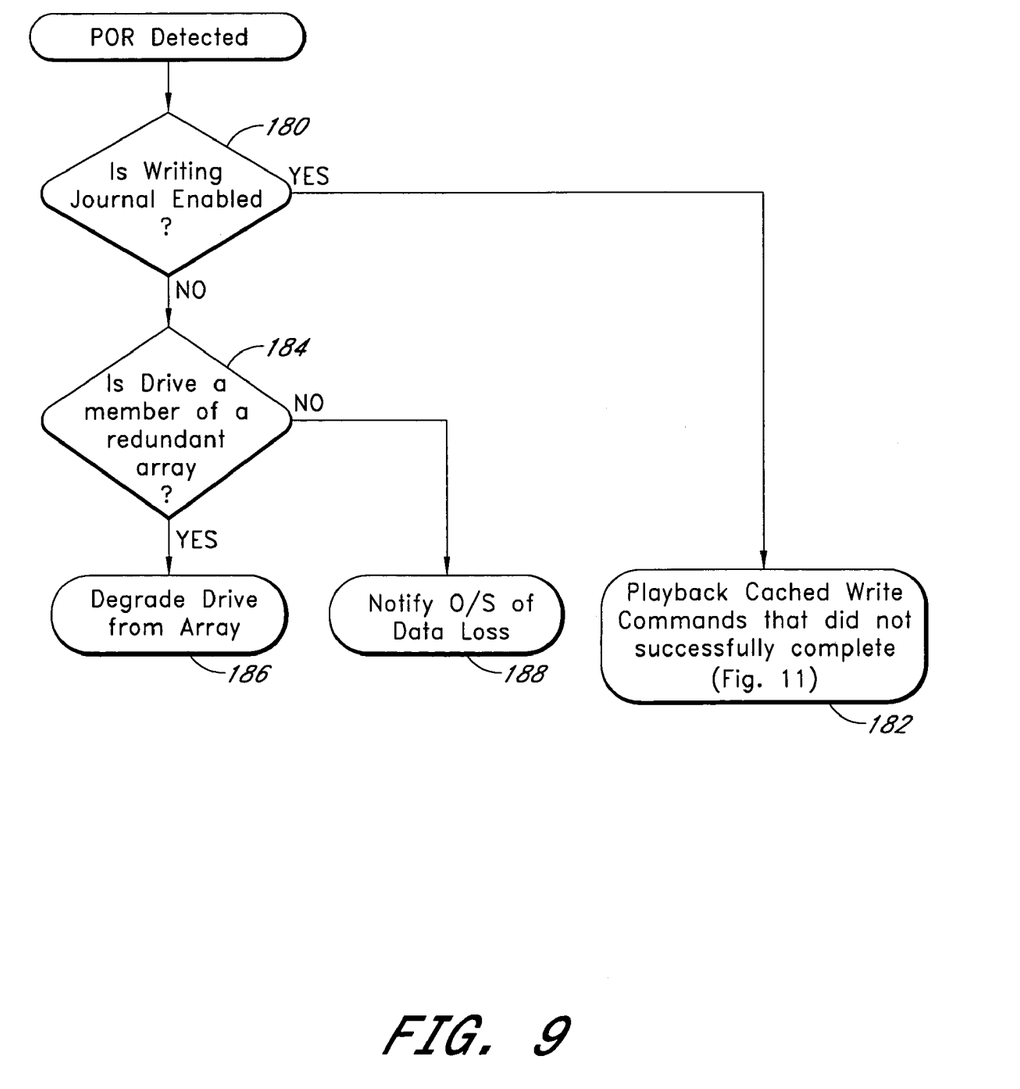
FIG. 9 illustrates corrective actions that may be taken by the array controller in response to detecting an unexpected power-on-reset.

FIG. 9 illustrates a sequence of decision steps that may be made by the array controller 32 to select an appropriate corrective action once a POR event has been detected. As depicted by blocks 180 and 182, if the array controller 32 implements write command journaling and has this feature enabled, it may respond to detection of the POR event by initiating a command playback sequence. The purpose of the command playback sequence is to account for the possibility that write data stored within the cache of a disk drive was lost (not committed to disk media) as the result of the POR event. Example write command journaling and playback processes are illustrated in FIGS. 10 and 11 and are described below.

As depicted by blocks 184–188 of FIG. 9, if write command journaling is not implemented or enabled, the corrective action taken in response to detection of the POR event may depend on whether the disk drive 34 that experienced the POR event is a member of a redundant array. Specifically, if the disk drive 34 is a member of a redundant array, the array controller 32 may degrade the disk drive to effectively remove it from the array, in which case the potentially-corrupt data stored by the disk drive may subsequently be reconstructed or obtained from the other disk drive(s) 34. If the disk drive 34 is not part of a redundant array, the error may alternatively be reported to the operating system of the host computer or processor 35. As will be apparent, various other types of corrective actions may additionally or alternatively be taken in response to detection of the POR event. For example a software RAID system may choose to degrade the PORed disk drive if notified of such an event. If a particular type of corrective action is hard-coded within the array controller 32 or other storage controller, decision logic of the type shown in FIG. 9 may be omitted.

FIG. 10 illustrates a write command journaling process that may be implemented by the array controller 32. This process makes use of the array controller's write cache 58 (FIG. 1), which includes a write data cache 58a and a Write Cache Descriptor Table 58b. As depicted by blocks 190–196, each time the array controller 32 receives a write command from the host 35, the array controller caches the write command by moving the associated write data to its write data cache 58a and updating the Write Cache Descriptor (WCD) Table 58b with a description of the write command. The array controller 32 then notifies the host 35 that the write command has been completed, although actual execution of the write command may not occur until a later point in time. As is known in the art, one benefit to caching array-level write commands in this manner is that it allows the write commands to be combined and/or reordered to improve performance.

If the array controller 32 controls the disk drives as a redundant array, each write command from the host will typically be a RAID array level command that will eventually be decomposed or translated into multiple drive-specific commands. The process of decomposing the write commands (as optionally combined and/or reordered) is omitted from FIGS. 10 and 11 to simplify the drawings. In other configurations, such as a single disk or JBOD (Just a Bunch of Disks) configuration, each write command received from the host 35 may be specific to a particular disk drive 34.

In step 198, the array controller 32 determines whether either (1) the number of cached write commands exceeds a selected threshold M, or (2) a write command has been cached for more than a selected time threshold N. If either or both of these conditions are met, an array-level cache flush operation is initiated (block 200, which is detailed in FIG. 11). This causes the cached write commands (as translated into drive-specific commands, if applicable) to be issued to the corresponding disk drive or drives 34.

FIG. 11 illustrates a flush/playback process that may be executed by the array controller 32 whenever either (1) a flush of the array controller's write cache 58 is initiated in block 200 of FIG. 10, or (2) an unexpected disk drive POR event is detected. In step 210, the index of the Write Cache Descriptor (WCD) Table 58b is reset to point to the first entry (cache descriptor) stored therein. This cache descriptor describes a cached array-level write command to be executed by the array controller 32. If the array controller supports command aggregation, this array-level write command may represent an aggregation of multiple write commands received from the host 35.

In steps 212 and 214, the referenced cache descriptor is read from the Write Cache Descriptor Table 58b, and the associated write data is sent from the write data cache 58a to the disk drive or drives 34 invoked by this write command. If the disk array is operated as a redundant array, this process typically involves translating the cached array-level write command into multiple drive-specific write commands according to a RAID algorithm, and issuing these drive-specific write commands to the corresponding disk drives 34. In addition, if the cached write data is to be sent to the disk drives 34 using one or more read-modify-write operations (as in the case of RAID 5 configurations), read commands may initially be issued to some or all of the disk drives 34 to read out one or more blocks of data to be modified. In other configurations and scenarios, the cached array-level write command may be issued to a particular disk drive 34 without translation into multiple drive-specific write commands. Typically, each invoked disk drive 34 will initially store the write data it receives in its respective write cache 52 without committing this data to disk media 54.

In block 216 of FIG. 11, the array controller 32 determines whether any disk drive POR events were detected as a result of the drive command execution sequence of FIG. 8, and loops back to step 210 if this determination is positive. Thus, for example, if a disk drive POR event occurs during execution of the first cached array-level command, the process of executing this array-level command will be repeated by the array controller 32. If no disk drive POR is detected in step 216, and one or more additional entries exist in the Write Cache Descriptor Table 58b (block 218), the table index is incremented (block 220), and steps 212 and 214 are repeated to execute the next array-level write command.

When no remaining entries exist in the Write Cache Descriptor Table 58b at block 218, flush commands are issued to all of the disk drives 34 (block 222) to cause the disk drives to commit all write data stored in their respective caches 52 to disk media 54. If a POR is detected during this disk-level cache flush process (block 224), the program loops back to step 210 to restart the process with the first entry in the Write Cache Descriptor Table 58b. If, on the other hand, the disk-level cache flush operation completes without detection of a disk drive POR, the Write Cache Descriptor Table 58b is cleared to complete the flush of the array controller's write cache 58 (blocks 226 and 228).

Note that as the result of multi-tasking, additional write commands may be received from the host 35 and written to array controller's write cache 58 during execution of the flush/playback sequence of FIG. 11. These newly added write commands are not cleared from the Write Cache Descriptor Table 58b during the current iteration of the FIG. 11 sequence, but are instead processed during a subsequent iteration. Read commands received from the host 35 that request data in the array controller's write cache 58 are serviced from the cache 58 or blocked until the flush/playback sequence is completed.

As will be apparent from the foregoing, FIGS. 10 and 11 represent an embodiment in which write command journaling and playback is performed at the array level, such that cached write data is rewritten to the array as a whole rather than merely being rewritten to the drive that underwent the POR. In some configurations, such as single-drive and JBOD configurations, it may be preferable to perform write command journaling and playback at the disk drive level. This may be accomplished by separately caching the disk-level write commands and write data issued to each of the one or more disk drives 34 of the storage system, such that if a particular disk drive undergoes a POR, the drive-level write commands and data for that disk drive may be reissued to that drive.

Although the various inventive features have been described primarily in the context of a disk array system 30, the invention is not so limited. For example, the disclosed POR detection and recovery features may also be implemented within single-disk-drive systems, in which case the associated process steps may be embodied within BIOS routines or other code executed by the host system's processor. Further, although the various POR detection methods have been described primarily in the context of ATA disk drives, they may also be applied to other types of disk drives that support similar security and/or power cycle count features, including disk drives based on standards that are not yet available.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the claims.

What is claimed is:

1. A disk array system, comprising:

a plurality of disk drives; and an array controller that controls the plurality of disk drives as a redundant array with a write caching feature of each disk drive enabled;

wherein the array controller monitors each of the plurality of disk drives to detect power-on-reset events at least in part by (a) setting passwords on each of the disk drives to place each such disk drive in an unlocked state, such that disk drives that experience power-on-reset events will enter into a locked state in which they will abort data transfer commands, and (b) when a disk drive that has been placed into the unlocked state aborts a data transfer command, performing a power-on-reset test to evaluate whether the disk drive has experienced a power-on-reset event since being placed into the unlocked state.

2. The disk array system of claim 1, wherein the array controller performs the power-on-reset test at least in part by reading a current power cycle count attribute of the disk drive, and comparing the current power cycle count attribute to a previously read power cycle count attribute for the disk drive.

3. The disk array system of claim 2, wherein the previously read power cycle count attribute is a value read from the disk drive during an initialization sequence.

4. The disk array system of claim 1, wherein the array controller performs the power-on-reset test at least in part by reading a power cycle count attribute of the disk drive to evaluate whether the disk drive has undergone a power cycle event since an initialization of the disk drive.

5. The disk array system of claim 1, wherein the array controller performs the power-on-reset test at least in part by determining whether the disk drive has transitioned out of an Ultra-DMA mode since being placed in the Ultra-DMA mode during initialization.

6. The disk array system of claim 1, wherein the array controller is responsive to detection, during the power-on-reset test, that the disk drive has undergone a power-on-reset event by treating data stored by the disk drive as corrupt.

7. The disk array system of claim 1, wherein the array controller maintains a cache of write data written to the disk drives, and is responsive to detection of disk drive power-on-reset events by resending the write data from the cache to the disk drives to correct for a potential data loss of write data stored in a disk drive's-cache but not yet committed to disk media.

8. The disk array system of claim 1, wherein the array controller additionally performs a power-on-reset test of a disk drive when a disk drive command timeout error occurs.

9. The disk array system of claim 1, wherein the array controller additionally performs a power-on-reset test of a disk drive when an illegal disk drive status is detected during a command execution sequence.

10. The disk array system of claim 1, wherein each of the plurality of disk drives is an Advanced Technology Attachment (ATA) disk drive.

11. A method of controlling a disk drive so as to detect power-on-reset events, the method comprising:
issuing a set password command to the disk drive to cause the disk drive to enter an unlocked state, wherein the disk drive is responsive to a power-on-reset event while in the unlocked state by entering into a locked state in which data transfer commands are aborted;
issuing a data transfer command to the disk drive subsequently to issuing the set password command; and
if the disk drive aborts the data transfer command, performing a power-on-reset test to evaluate whether the disk drive aborted the data transfer command as a result of a power-on-reset event that caused the disk drive to enter into the locked state.

12. The method of claim 11, wherein performing the power-on-reset test comprises reading a current power cycle count attribute of the disk drive, and comparing the current power cycle count attribute to a previously read power cycle count attribute for the disk drive.

13. The method of claim 12, wherein the previously read power cycle count attribute is a value that was read from the disk drive during an initialization sequence.

14. The method of claim 11, wherein performing the power-on-reset test comprises detecting whether the disk drive has undergone a power cycle event since an initialization of the disk drive.

15. The method of claim 11, wherein performing the power-on-reset test comprises determining whether the disk drive has transitioned out of an Ultra-DMA mode.

16. The method of claim 11, wherein the step of issuing the set password command is performed in response to creation of a redundant disk array that includes the disk drive.

17. The method of claim 11, wherein the disk drive is a member of a redundant disk array, and the method further comprises degrading the disk drive if a power-on-reset event is detected as a result of the power-on-reset test.

18. The method of claim 17, wherein degrading the disk drive comprises initiating a rebuild operation to rebuild data stored by the disk drive.

19. The method of claim 11, further comprising, if a power-on-reset event is detected, resending write data to the disk drive to correct for a potential data loss of write data that was stored in a disk drive's cache but not yet committed to disk media at the time of the power-on-reset event.

20. A computer readable storage medium having stored thereon executable instructions which, when executed by a processor coupled to a disk drive, cause the processor to:
issue a set password command to the disk drive to cause the disk drive to enter an unlocked state, wherein the disk drive is responsive to a power-on-reset event while in the unlocked state by entering into a locked state in which data transfer commands are aborted;
issue a data transfer command to the disk drive subsequently to issuing the set password command; and
if the disk drive aborts the data transfer command, perform a power-on-reset test to evaluate whether the disk drive aborted the data transfer command as a result of a power-on-reset event that caused the disk drive to enter into the locked state.

* * * * *